United States Patent
Bialy et al.

(10) Patent No.: US 12,415,684 B2
(45) Date of Patent: Sep. 16, 2025

(54) BELT CONVEYOR FOR CONVEYING FOODSTUFF PRODUCTS

(71) Applicant: PROVISUR TECHNOLOGIES, INC., Chicago, IL (US)

(72) Inventors: Jürgen Bialy, Oeschebüttel (DE); Klaus Guggemos, Rettenberg (DE); Paul Goroll, Waltenhofen (DE); Matthias Hindorff, Waltenhofen (DE); Alexander May, Waltenhofen (DE); Florian Mohr, Sulzberg (DE); Klaus Dieter Schroff, Constance (DE)

(73) Assignee: PROVISUR TECHNOLOGIES, INC., Chicago, IL (US)

( * ) Notice: Subject to any disclaimer, the term of this patent is extended or adjusted under 35 U.S.C. 154(b) by 89 days.

(21) Appl. No.: 18/548,900

(22) PCT Filed: Feb. 17, 2022

(86) PCT No.: PCT/EP2022/053955
§ 371 (c)(1),
(2) Date: Sep. 3, 2023

(87) PCT Pub. No.: WO2022/184460
PCT Pub. Date: Sep. 9, 2022

(65) Prior Publication Data
US 2024/0158179 A1 May 16, 2024

(30) Foreign Application Priority Data
Mar. 3, 2021 (DE) .................. 10 2021 105 104.5

(51) Int. Cl.
*B65G 47/57* (2006.01)
*B65G 15/64* (2006.01)
(Continued)

(52) U.S. Cl.
CPC ............. *B65G 47/57* (2013.01); *B65G 15/64* (2013.01); *B65G 23/04* (2013.01); *B65G 41/002* (2013.01);
(Continued)

(58) Field of Classification Search
None
See application file for complete search history.

(56) References Cited

U.S. PATENT DOCUMENTS 3,109,532 A 11/1963 Milan
3,685,634 A 8/1972 Bergling
(Continued)

FOREIGN PATENT DOCUMENTS

CN 103552791 A 2/2014
CN 107802214 A 3/2018
(Continued)

OTHER PUBLICATIONS

Schaeffler AG advertising brochure, as of Jan. 2014, available No. later than Feb. 2014, IDAM INA Drives and Mechatronics, X-Y-Positioniersysteme auf Basis der Planarmotor-Technologie, 12 pages (URL: https://web.archive.org/web/20140000000000*/https://www.schaeff-ler.com/remotemedien/media_shared_media/08_media_library/01_publications/idam_1/brochures/downloads_32/idam_planarmotoren_de_de.pdf ).

(Continued)

*Primary Examiner* — Kavel Singh
(74) *Attorney, Agent, or Firm* — Klintworth & Rozenblat LLP (57) ABSTRACT

The invention relates to a belt conveyor (1) for conveying products to be conveyed (e.g. food products), with a deflection (8), in particular as a rotatable deflection pulley (8), and a conveyor belt (2) which is guided around the deflection (8). The invention provides that the deflection (8) comprises (Continued)

a central circumferential annular groove (11), and the conveyor belt (2) comprises a centre bar (12) on the inside which engages in the annular groove (11) of the deflection (8).

23 Claims, 10 Drawing Sheets

(51) Int. Cl.
    *B65G 23/04*        (2006.01)
    *B65G 41/00*        (2006.01)
    *B65G 47/90*        (2006.01)
    *B65G 54/02*        (2006.01)

(52) U.S. Cl.
    CPC .............. *B65G 47/90* (2013.01); *B65G 54/02* (2013.01); *B65G 2201/0202* (2013.01)

(56) References Cited

U.S. PATENT DOCUMENTS

| | | | |
|---|---|---|---|
| 4,800,999 | A | 1/1989 | Matsuo |
| 5,078,255 | A | 1/1992 | Haley |
| 5,156,093 | A | 10/1992 | Azukizawa et al. |
| 5,319,186 | A | 6/1994 | Enhardt |
| 5,880,541 | A | 3/1999 | Hinds et al. |
| 5,947,361 | A | 9/1999 | Berger et al. |
| 6,045,319 | A | 4/2000 | Uchida et al. |
| 6,390,276 | B1 | 5/2002 | Haug et al. |
| 6,505,730 | B1 | 1/2003 | Linder |
| 7,926,644 | B2 | 4/2011 | Mendenhall |
| 8,025,142 | B2 * | 9/2011 | Alexander ......... B65G 47/5122 198/479.1 |
| 8,166,856 | B2 | 5/2012 | Kim et al. |
| 8,707,840 | B2 | 4/2014 | Weber |
| 8,820,202 | B2 | 9/2014 | Schaub |
| 9,221,615 | B2 | 12/2015 | Bauer |
| 9,382,025 | B2 * | 7/2016 | De Vries ................. B65G 43/08 |
| 9,764,490 | B2 | 9/2017 | Weber |
| 10,094,843 | B2 | 10/2018 | Malinowski et al. |
| 10,227,182 | B2 | 3/2019 | Burk et al. |
| 10,308,437 | B2 | 6/2019 | Clössner et al. |
| 10,569,973 | B2 | 2/2020 | Burk et al. |
| 10,577,136 | B2 | 3/2020 | Burk et al. |
| 10,618,749 | B2 | 4/2020 | Clössner et al. |
| 10,632,637 | B2 * | 4/2020 | Rother .................... B26D 7/32 |
| 10,751,899 | B2 | 8/2020 | Lischinski et al. |
| 10,815,062 | B2 * | 10/2020 | Droste ................... B65G 15/12 |
| 10,836,063 | B2 | 11/2020 | Mayer et al. |
| 11,286,075 | B2 * | 3/2022 | Grasselli ................ B65B 5/068 |
| 11,964,827 | B2 | 4/2024 | Mueller |
| 2003/0089581 | A1 | 5/2003 | Thompson et al. |
| 2003/0230941 | A1 | 12/2003 | Jacobs |
| 2004/0016331 | A1 | 1/2004 | Wolcott et al. |
| 2004/0231480 | A1 | 11/2004 | Wattles et al. |
| 2005/0189271 | A1 | 9/2005 | Cerutti et al. |
| 2008/0038020 | A1 | 2/2008 | Chung et al. |
| 2010/0256810 | A1 | 10/2010 | Weber |
| 2012/0042758 | A1 | 2/2012 | Weber |
| 2012/0186948 | A1 | 7/2012 | Ishino et al. |
| 2013/0062160 | A1 | 3/2013 | Steinbach et al. |
| 2013/0140372 | A1 | 6/2013 | Mahadeswaraswamy et al. |
| 2013/0153364 | A1 | 6/2013 | Bauer |
| 2013/0192175 | A1 | 8/2013 | Matysiak et al. |
| 2014/0224620 | A1 | 8/2014 | Fullerton et al. |
| 2014/0253896 | A1 | 9/2014 | Wu et al. |
| 2015/0321369 | A1 | 11/2015 | Froese et al. |
| 2016/0282378 | A1 | 9/2016 | Malinowski et al. |
| 2017/0174445 | A1 | 6/2017 | Nichau et al. |
| 2017/0212506 | A1 | 7/2017 | Pfarr et al. |
| 2018/0303034 | A1 | 10/2018 | Hasenour et al. |
| 2018/0303035 | A1 | 10/2018 | Hasenour |
| 2018/0345520 | A1 | 12/2018 | Eckhardt et al. |
| 2019/0152724 | A1 | 5/2019 | Philipp et al. |
| 2020/0030995 | A1 | 1/2020 | Lu et al. |
| 2020/0031594 | A1 | 1/2020 | Ragan et al. |
| 2020/0254641 | A1 | 8/2020 | Hocker et al. |

FOREIGN PATENT DOCUMENTS

| | | | |
|---|---|---|---|
| CN | 111279595 A | 6/2020 | |
| DE | 3642123 A1 | 6/1988 | |
| DE | 3711688 A1 | 10/1988 | |
| DE | 4033475 A1 | 4/1992 | |
| DE | 19515199 A1 * | 10/1996 | .......... B65G 47/244 |
| DE | 19522189 A1 | 1/1997 | |
| DE | 19738159 A1 | 3/1999 | |
| DE | 19914707 A1 | 10/2000 | |
| DE | 10009903 A1 | 9/2001 | |
| DE | 10043304 A1 | 9/2001 | |
| DE | 19955042 C2 | 4/2002 | |
| DE | 10143506 A1 | 5/2003 | |
| DE | 10220006 A1 | 11/2003 | |
| DE | 202004008678 U1 | 8/2004 | |
| DE | 102006025545 A1 | 12/2007 | |
| DE | 102007005994 A1 | 8/2008 | |
| DE | 102007006355 A1 | 8/2008 | |
| DE | 102007020392 A1 | 11/2008 | |
| DE | 102007025822 A1 | 12/2008 | |
| DE | 102007028857 A1 | 1/2009 | |
| DE | 202008010439 U1 | 1/2009 | |
| DE | 202008016678 U1 | 3/2009 | |
| DE | 102008039764 A1 | 5/2010 | |
| DE | 202010010157 U1 | 10/2010 | |
| DE | 102009046893 A1 | 5/2011 | |
| DE | 102010019248 A1 | 11/2011 | |
| DE | 202011106265 U1 | 12/2011 | |
| DE | 102010055722 A1 | 6/2012 | |
| DE | 102012004372 A1 | 9/2013 | |
| DE | 102013212377 A1 | 12/2014 | |
| DE | 102014106400 A1 | 11/2015 | |
| DE | 102014214696 A1 | 1/2016 | |
| DE | 102014116232 A1 | 5/2016 | |
| DE | 102014116233 A1 | 5/2016 | |
| DE | 102014118965 A1 | 6/2016 | |
| DE | 102014118972 A1 | 6/2016 | |
| DE | 102014118978 A1 | 6/2016 | |
| DE | 102014119350 A1 | 6/2016 | |
| DE | 102015109633 A1 | 12/2016 | |
| DE | 102015112561 A1 | 2/2017 | |
| DE | 102015114370 A1 | 3/2017 | |
| DE | 102016107976 A1 | 11/2017 | |
| DE | 102016108002 A1 | 11/2017 | |
| DE | 102016109435 A1 | 11/2017 | |
| DE | 102016110039 A1 | 12/2017 | |
| DE | 102016111357 A1 | 12/2017 | |
| DE | 102016122171 A1 | 4/2018 | |
| DE | 102016224951 | 6/2018 | |
| DE | 102017002020 A1 * | 9/2018 | ............. B65G 23/44 |
| DE | 102018102919 B3 | 3/2019 | |
| DE | 102017129162 A1 | 6/2019 | |
| DE | 102017131304 A1 | 6/2019 | |
| DE | 102018105807 A1 | 9/2019 | |
| DE | 102019101290 B3 | 1/2020 | |
| DE | 202020102692 U1 | 6/2020 | |
| DE | 102019110313 B3 | 7/2020 | |
| DE | 102019117431 A1 | 12/2020 | |
| DE | 102019117275 A1 | 1/2021 | |
| DE | 102021105103 A1 | 9/2022 | |
| DE | 102021105105 A1 | 9/2022 | |
| EP | 0246098 A2 | 11/1987 | |
| EP | 0350473 A1 | 1/1990 | |
| EP | 0373844 A1 | 6/1990 | |
| EP | 0496046 A1 | 7/1992 | |
| EP | 0647552 A1 | 4/1995 | |
| EP | 0482424 B1 | 1/1996 | |
| EP | 1216938 A1 | 6/2002 | |
| EP | 2407037 A1 | 1/2012 | |
| EP | 2460446 A1 | 6/2012 | |
| EP | 2479111 A2 | 7/2012 | |
| EP | 2479123 A1 | 7/2012 | |
| EP | 2599721 A2 | 6/2013 | |
| EP | 2653036 A1 | 10/2013 | |

(56) References Cited

FOREIGN PATENT DOCUMENTS

| | | |
|---|---|---|
| EP | 2673224 B1 | 1/2015 |
| EP | 3028774 A1 | 6/2016 |
| EP | 3037369 B1 | 3/2018 |
| EP | 3339221 | 6/2018 |
| EP | 3378804 A1 | 9/2018 |
| EP | 3501676 A1 | 6/2019 |
| EP | 3656707 A1 | 5/2020 |
| EP | 3656709 A1 | 5/2020 |
| EP | 3904249 A1 | 11/2021 |
| EP | 3707810 B1 | 1/2022 |
| EP | 2759047 B1 | 3/2022 |
| EP | 4107026 A1 | 12/2022 |
| EP | 3602759 B1 | 6/2023 |
| GB | 2185720 A | 7/1987 |
| JP | S54139687 A | 10/1979 |
| JP | S5978311 U | 5/1984 |
| JP | 2019102658 A | 6/2019 |
| KR | 20130000763 A1 | 1/2013 |
| KR | 102063156 B1 | 1/2020 |
| WO | WO2003029651 A2 | 4/2003 |
| WO | WO2007135006 A1 | 11/2007 |
| WO | WO2009143335 A2 | 11/2009 |
| WO | WO2010011237 A1 | 1/2010 |
| WO | WO2010085670 A1 | 7/2010 |
| WO | WO2011138448 A1 | 11/2011 |
| WO | 2013/059934 | 5/2013 |
| WO | WO2013098202 A1 | 7/2013 |
| WO | WO2013131893 A1 | 9/2013 |
| WO | WO2015162182 A1 | 10/2015 |
| WO | WO2016012171 A1 | 1/2016 |
| WO | WO2016071062 A1 | 5/2016 |
| WO | WO2017202521 A1 | 11/2017 |
| WO | WO2018019810 A1 | 2/2018 |
| WO | 2018067567 | 4/2018 |
| WO | 2018208658 | 11/2018 |
| WO | WO2020073118 A1 | 4/2020 |
| WO | 2020239930 A1 | 12/2020 |
| WO | 2020243814 | 12/2020 |
| WO | WO2020260564 A1 | 12/2020 |
| WO | 2021126737 A2 | 6/2021 |
| WO | 2022184455 A1 | 9/2022 |
| WO | WO2024092082 A1 | 5/2024 |

OTHER PUBLICATIONS

Excerpt from textbook "Standard Handbook of Industrial Automation", ISBN 9781461319634, publication date Dec. 6, 2012.
EU Directive 2006/42/EC of the European Parliament and of the Council dated May 17, 2006 on machinery, and amending Directive 95/16/EC (recast), 87 pages.
"Flying Motion XPlanar" Nov. 1, 2018,pp. 1-28, XP055668904.
Timocom GmbH "Stetigförderer TIMOCOMTransportlexikon" Feb. 25, 2021,pp. 1-1 XP055922793.
International Search Report and Written Opinion for PCT/EP2022/053976 mailed dated Sep. 5, 2022, 23 pages.
International Search Report and Written Opinion for PCT/EP2022/053942 mailed dated Sep. 8, 2022, 25 pages.
International Search Report and Written Opinion for PCT/EP2022/053944 mailed dated May 24, 2022, 12 pages.
International Search Report and Written Opinion for PCT/EP2022/053955 mailed dated May 4, 2022, 14 pages.
International Search Report and Written Opinion for PCT/EP2022/053951 mailed dated May 17, 2022, 17 pages.
International Search Report and Written Opinion for PCT/EP2022/053953 mailed dated May 31, 2022, 14 pages.

* cited by examiner

BELT CONVEYOR FOR CONVEYING FOODSTUFF PRODUCTS

FIELD OF THE DISCLOSURE

The invention relates to a belt conveyor for conveying products to be conveyed (e.g. food products).

BACKGROUND

In the prior art, food processing installations are known which cut food products (e.g. pieces of meat, pieces of cheese, salami sticks) into slices by means of a cutting device, such cutting devices also being referred to as "slicers" in the relevant technical terminology. The slices cut by the slicing device then fall onto a belt conveyor and are transported away from the belt conveyor. The known belt conveyors have a drive pulley and a deflection pulley for this purpose, whereby a conveyor belt is guided around the drive pulley and the deflection pulley and is driven by the drive pulley. Here, the width of the deflection pulley also determines the width of the conveyor belt, so that the known belt conveyors are relatively inflexible with respect to the width of the conveyor belt.

With regard to the technical background of the invention, reference should also be made to DE 10 2017 002 020 A1, DE 10 2014 106 400 A1 and DE 10 2019 127 275 A1.

SUMMARY

The invention is therefore based on the task of creating a correspondingly improved belt conveyor.

This task is solved by a belt conveyor according to the invention in accordance with the main claim.

First of all, in accordance with known prior art belt conveyors, the belt conveyor according to the invention has a first conveyor belt which is guided around a first deflection and is typically driven by a drive pulley. The first deflection may be, for example, a deflection pulley which is rotatably mounted. However, it is alternatively also possible that the first deflection is not formed by a rotatable deflection pulley, but by a rounded edge around which the conveyor belt is guided.

According to the invention, it is now provided that the first deflection has a circumferential annular groove in the center. Furthermore, according to the invention, it is provided that the first conveyor belt has a centre bar on the inside which engages in the annular groove of the first deflection. The first conveyor belt is thus guided by the centre bar in the annular groove of the first deflection, so that the first conveyor belt cannot move laterally relative to the first deflection. This offers the possibility that the first conveyor belt is wider than the first deflection. This makes the belt conveyor according to the invention more flexible, because conveyor belts with different widths can be used.

In general, it should be mentioned that the belt conveyor according to the invention is preferably designed to convey food products, such as stacks of slices or shingles of slices of pieces of cheese or pieces of meat. However, the invention is not limited to food products with respect to the products to be conveyed, but is generally suitable for conveying products to be conveyed.

In a preferred embodiment of the invention, the belt conveyor comprises at least two conveyor belts arranged next to one another, which are each guided around a deflection, the two deflections each having an annular groove in order to guide a centre bar in the two conveyor belts. In this case, the two conveyor belts are arranged next to each other and preferably form a continuous conveying surface, although different conveying speeds of the two conveyor belts are preferably possible. There is a gap between the two adjacent conveyor belts, which depends on the width of the conveyor belts. If, for example, a continuous conveying surface is desired, relatively wide conveyor belts can be used, resulting in a correspondingly narrow gap between the adjacent conveyor belts. If, on the other hand, it is desired that, for example, a gripper can dive from above through the gap between the adjacent conveyors, then correspondingly narrower conveyor belts are used, resulting in a correspondingly larger gap between the adjacent conveyor belts.

In one variant of the invention, the conveyor belts have a T-shaped cross-section, with the vertical leg of the T-shape forming the centre bar that engages in the annular groove of the respective deflection to guide the conveyor belt.

In another variant of the invention, on the other hand, the conveyor belts have a trapezoidal cross-section, in particular in the form of an isosceles trapezoid. The smaller side of the trapezoid forms the centre bar, which engages in the annular groove of the respective deflection in order to fix the conveyor belt against a fixed lateral displacement. The longer side of the trapezoidal shape, on the other hand, forms the support surface for the conveyed products.

In contrast, yet another variant of the invention provides for a V-shaped cross-section of the respective conveyor belt, the V-shape forming with its tip the centre bar which engages in the annular groove of the respective deflection in order to prevent lateral displacement of the conveyor belt.

In still another variant of the invention, on the other hand, it is provided that the conveyor belt has a semicircular cross-section with a rounded side and a straight side. The straight side of the semicircular cross-section forms the support surface for the conveyed products, while the semicircular side of the cross-section forms the centre bar which engages in the annular groove in the respective deflection and thus prevents lateral displacement of the conveyor belt.

Alternatively, a round cross-section of the conveyor belt is also possible.

It should be mentioned here that the invention is not limited to the preferred embodiments described above with respect to the cross-sectional shape of the conveyor belt. Rather, other cross-sectional shapes of the conveyor belt are also possible within the scope of the invention.

It has already been mentioned above that the belt conveyor may have a plurality of conveyor belts arranged side by side. In this case, each conveyor belt preferably has a centre bar which engages in a corresponding annular groove in the associated deflection in order to prevent lateral displacement of the respective conveyor belt.

Furthermore, it has already been mentioned above that the deflection can be formed by a rotatable deflection pulley or alternatively by a rounded edge. In both cases, the deflection is preferably held by a support bar which, in the preferred embodiment, runs in the conveying direction between the upper run and the lower run of the respective conveyor belt. If the deflection consists of a rotatable deflection pulley, there is preferably a bearing point at the distal end of the support bar for the rotatable mounting of the deflection pulley. In the simplest case, the bearing point consists of a plain bearing in which the axis of the deflection pulley can rotate.

Furthermore, it has already been mentioned above that the guidance of the conveyor belt in the deflection enables different widths of the conveyor belt, since a lateral displacement of the conveyor belt relative to the deflection is prevented by the interlocking of the centre bar on the one hand and the annular groove on the other hand. It is therefore possible within the scope of the invention for the conveyor belts to project laterally beyond the respective deflection and thus have a greater width than the deflection itself.

The belt conveyor according to the invention is preferably used for conveying food products, such as pieces of sausage, pieces of cheese or stacks of slices comprising slices of cheese or slices of sausage. The invention therefore also comprises a food processing installation with such a belt conveyor according to the invention.

The belt conveyor according to the invention is particularly advantageously suited for product removal from conveyed-products carriers, which are also referred to as "movers" or "shuttles" in the relevant technical terminology. Such conveyed-products carriers are known, for example, from the German patent application DE 10 2020 105 678.8, so that the contents of this earlier patent application are fully attributable to the present description with regard to the structure and mode of operation of such conveyed-products carriers.

It should be mentioned here that the individual conveyed-products carriers can be moved along a conveying path by a contactless drive system within a conveying surface, such drive systems being available, for example, from the German company Beckhoff Automation GmbH under the product name "XPlanar".

The belt conveyor according to the invention can be used here to remove the food products (e.g. stacks of slices) located on the individual conveyed-products carriers from the conveyed-products carrier. The belt conveyor according to the invention is therefore preferably arranged above the conveying surface and can be swiveled vertically. In this way, the belt conveyor can be lowered with its infeed end onto the conveyed-products carrier in order to pick up the food products from the conveyed-products carrier. Otherwise, on the other hand, the belt conveyor is preferably swiveled up so that the individual conveyed-products carriers can pass through the belt conveyor, so that the free movement of the individual conveyed-products carriers is not impaired by the belt conveyor.

To facilitate product removal from the conveyed-products carrier, the latter preferably has on its upper side a plurality of parallel and elongated recesses into which the individual conveyor belts of the belt conveyor can dive during a removal of the conveyed product from the conveyed-products carrier in order to engage under the conveyed product located on the conveyed-products carrier. The recesses in the conveyed-products carrier are therefore generally wider than the individual conveyor belts of the belt conveyor, so that the individual conveyor belts of the belt conveyor can be inserted into the recesses in the conveyed-products carrier. Details of this are known from the German patent application DE 10 2020 105 678.8 mentioned above, the contents of which are therefore to be fully attributed to the present description.

At this point, it should only be briefly mentioned that the conveyed-products carrier can have a large number of pins on its upper side, which are arranged in a matrix in pin rows and pin columns, whereby the adjacent pin rows and the adjacent pin columns each form in pairs one of the recesses mentioned above, into which the conveyor belts can dive to reach under the products being conveyed.

It has already been mentioned above that the individual conveyed-products carriers can be moved by a contactless drive system, such as that marketed by the German company Beckhoff Automation GmbH under the product name "XPlanar".

In general, it should be mentioned that the contactless drive system is preferably a magnetic levitation system, so that the individual conveyed-products carriers float above the conveying surface without contact. The conveying path of the individual conveyed-products carriers is here preferably freely programmable within the conveying surface, and preferably individually for each of the conveyed-products carriers. The movement of the individual product carriers is therefore not bound to a fixed conveying path, as is the case with some rail-bound drive systems.

Furthermore, it should be mentioned in general that the conveyor system can consist of numerous modules which are adjacent to each other and together form the conveying surface. The individual modules are preferably rectangular in order to be able to form the conveying surface without gaps. However, it should be mentioned that there can also be a small gap between the individual adjacent modules of the conveyor system.

Furthermore, it should be mentioned that the food processing installation according to the invention can also have several processing stations in addition to the belt conveyor serving as a take-off conveyor and the conveyed-products carriers as well as the associated drive system.

For example, the food processing installation according to the invention can have a cutting device which serves to cut food products (e.g. pieces of meat, pieces of cheese, salami sticks) into slices. Such cutting devices are sufficiently known from the prior art and are also referred to as "slicers" according to the usual technical terminology.

Furthermore, one of the processing stations of the food processing installation according to the invention may be a scale which serves to weigh the food products.

Furthermore, one of the processing stations of the food processing installation according to the invention may be a packaging machine, such as a thermoformer or a flow packer, used to package the food products.

Another example of a possible processing station is a product scanner used to scan the shape of the food products.

Further, the food processing installation may also include a press that is used to press the food products. An example of such a press is described in German patent DE 10 2019 110 313 B3, so that the contents of that earlier patent are fully attributable to the present description with respect to the structure and operation of such a press.

In this case, the food products can be transported on the individual conveyed-products carriers between the various processing stations, as is also known, for example, from DE 10 2019 127 275 A1.

It has already been mentioned above that the invention offers the possibility of using conveyor belts of different widths, since the individual conveyor belts are prevented from shifting in time by the interlocking of the centre bar and the annular groove. The width of the adjacent conveyor belts can be selected in such a way that a gap is formed between the adjacent conveyor belts which is sufficiently wide for a gripper to be able to dive into the gap between the adjacent conveyor belts in order to grip underneath the product lying on the conveyor belt from below, as is known per se from the earlier patent application WO 2010/011237 A1.

In this case, the gripper can have swivelling gripper arms which have a product support at their ends. For gripping a food product lying on the adjacent conveyor belts, the gripper is then opened and the gripper arms dive into the gap between the adjacent conveyor belts. The gripper is then closed so that the product supports of the gripper arms can grip the food product from below and lift it off the belt conveyor.

Other advantageous further embodiments of the invention are indicated in the dependent claims or are explained in more detail below together with the description of the preferred embodiments of the invention with reference to the figures.

DETAILED DESCRIPTION

In the following, the embodiment of a belt conveyor 1 according to the invention is described, which can be used, for example, in a food processing installation for conveying food products (e.g. stacks of slices of cheese or sausage), as will be described in detail.

The belt conveyor 1 has several conveyor belts 2, 3, which are arranged next to each other and form a uniform conveying surface with their respective upper run 4, 5. In addition, the drawing shows a lower run 6 and 7, respectively, on the underside in each case. It should be mentioned here that the belt conveyor 1 also has a larger number of conveyor belts 2, 3 arranged side by side. For simplification, however, only the two conveyor belts 2, 3 are shown in the drawings.

The two conveyor belts 2, 3 are each guided around a deflection pulley 8 or 9, as is known per se from the prior art. The two deflection pulleys 8, 9 are arranged coaxially and can be rotated independently of one another about a rotation axis 10.

Figure 5:
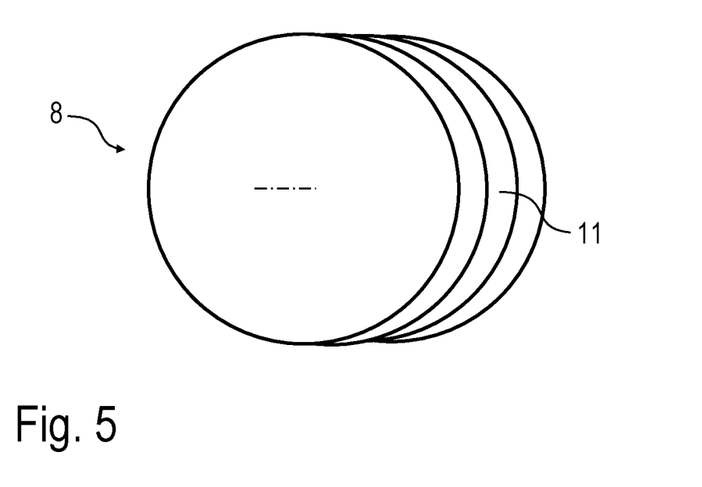
FIG. 5 shows a perspective view of a deflection pulley with an annular groove.
Figure 6:
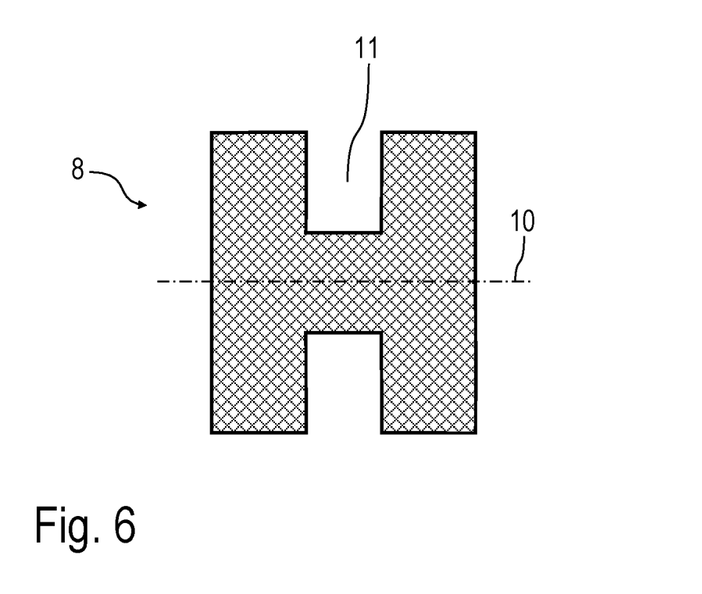
FIG. 6 shows a cross-sectional view through the deflection pulley according to FIG. 5.

The two deflection pulleys 8, 9 each have a circumferential annular groove 11 in the center, as can be seen in particular in FIGS. 5 and 6. The two conveyor belts 2, 3 each have a corresponding centre bar 12 or 13 on their inner side, which engages in the associated annular groove 11, the interlocking of the centre bars 12, 13 on the one hand and the annular groove 11 on the other hand resulting in guidance of the two conveyor belts 2, 3, as a result of which lateral displacement of the two conveyor belts 2, 3 on the associated deflection pulleys 8, 9 is prevented.

Figure 1:
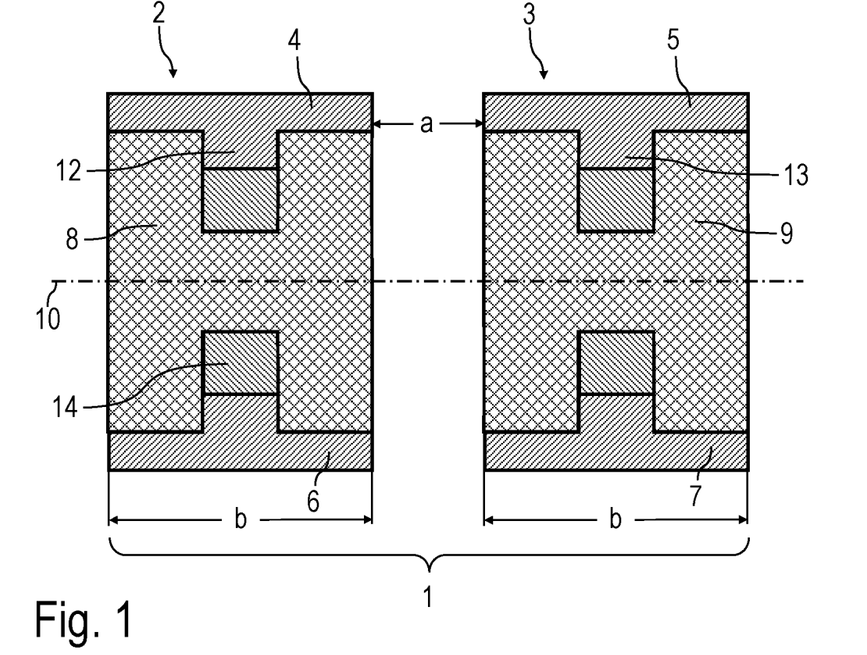
FIG. 1 shows a schematic representation of a belt conveyor according to the invention with two conveyor belts lying side by side.
Figure 2:
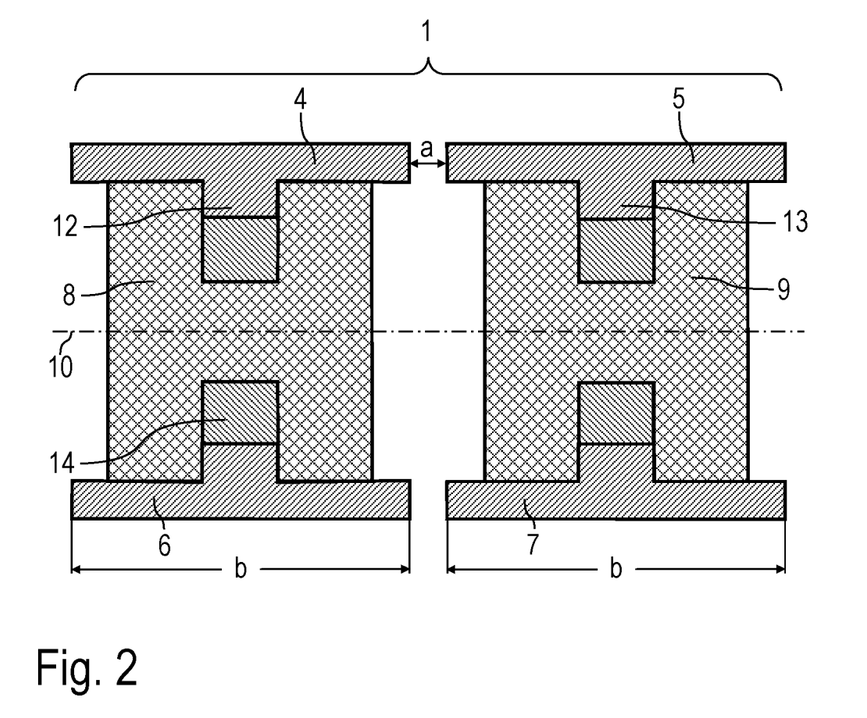
FIG. 2 shows a variation of FIG. 1 with a smaller distance between the adjacent conveyor belts.

The guidance of the two conveyor belts 2, 3 by the interlocking of the centre bars 12, 13 on the one hand and the annular groove 11 on the other hand makes it possible to use conveyor belts 2, 3 of different widths, as can be seen from a comparison of FIGS. 1 and 2. Thus, FIG. 1 shows a variant with a relatively large distance a between the adjacent conveyor belts 2, 3, whereas FIG. 2 shows a variant with a relatively small distance a between the two adjacent conveyor belts 2, 3. In the variant shown in FIG. 2, the two conveyor belts 2, 3 also project laterally beyond the associated deflection pulleys 8, 9.

Figure 3:
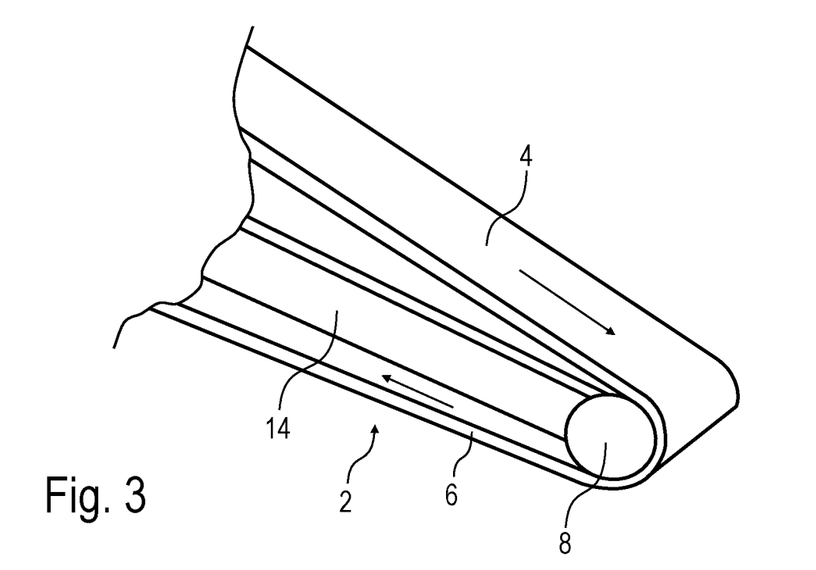
FIG. 3 shows a simplified perspective view of one of the two conveyor belts from FIGS. 1 and 2.
Figure 4:
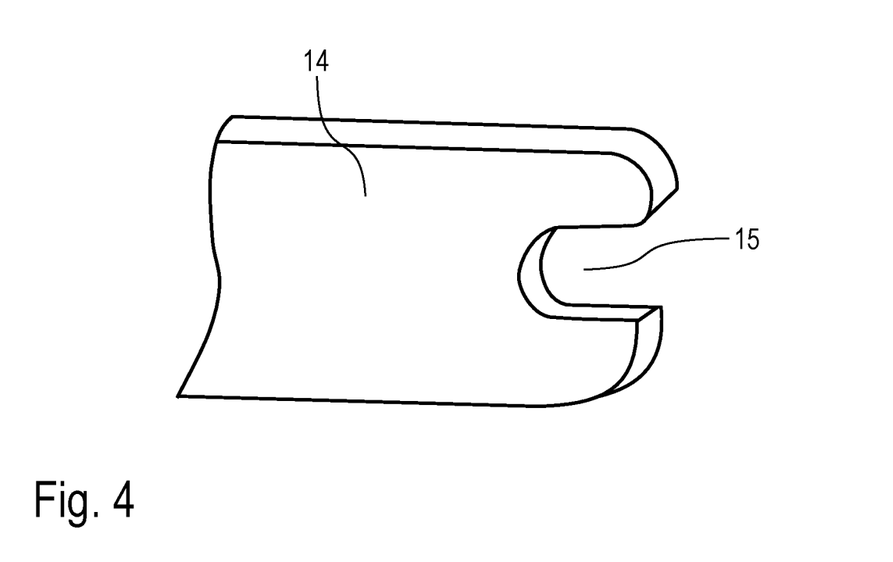
FIG. 4 shows a perspective view of a center bar for guiding the deflection pulley in the single conveyor belts according to FIGS. 1-3.

FIGS. 3 and 4 show a support bar 14 for guiding the deflection pulley 8. At the end of the support bar 14 there is a bearing point 15 which forms a plain bearing for the rotatable mounting of the deflection pulley 8. Furthermore, it can be seen from FIG. 3 that the support bar 14 is elongated and runs between the upper run 4 and the lower run 6 of the conveyor belt 2.

It has already been briefly mentioned above that the belt conveyor according to the invention as shown in FIGS. 1-6 can be used, for example, in a food processing installation. In the following, therefore, with reference to FIGS. 7 to 9B, the use of the belt conveyor 1 in such a food processing installation will be described.

Figure 7:
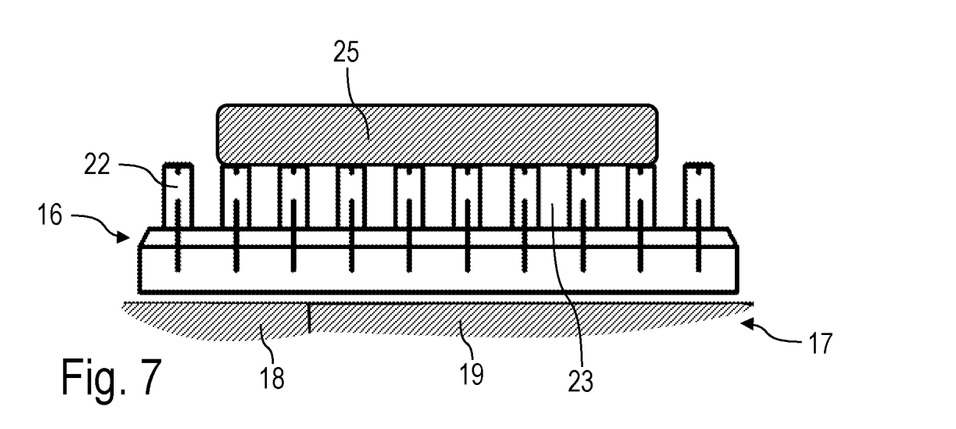
FIG. 7 shows a side view of a conveyed-products carrier that can be moved by a contactless drive system.
Figure 8:
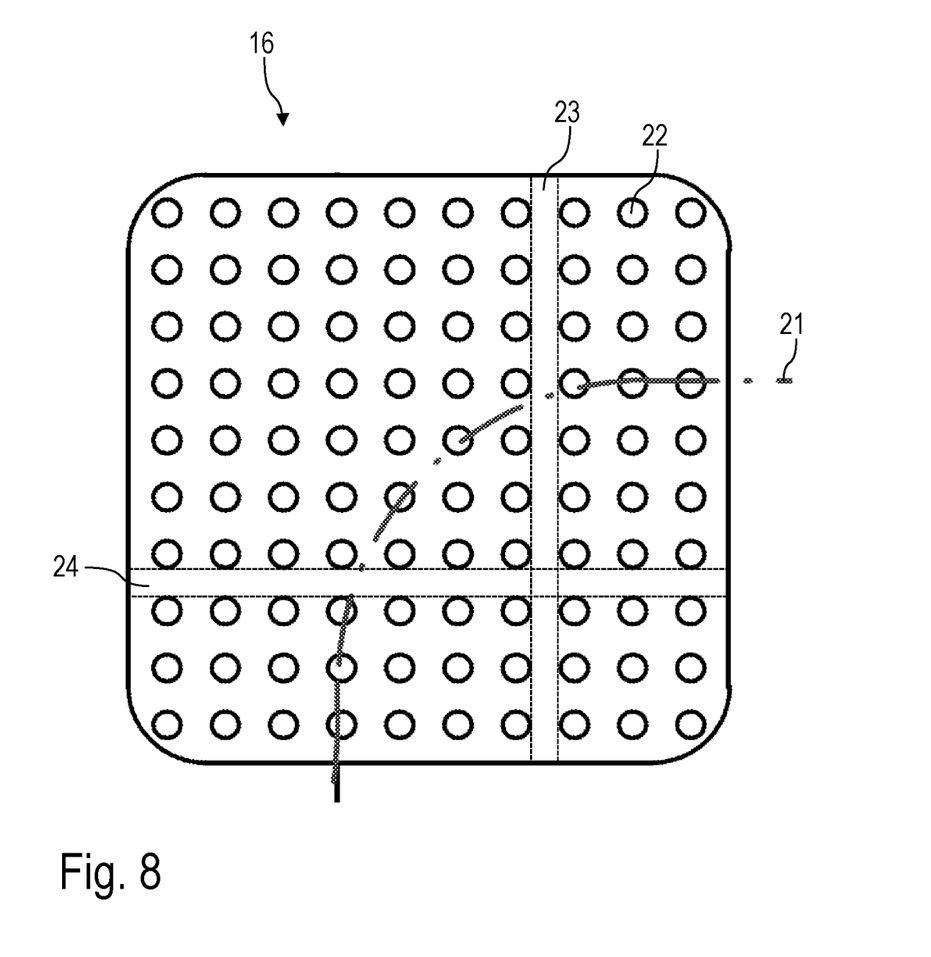
FIG. 8 shows a top view of the conveyed-products carrier according to FIG. 7.

For example, FIGS. 7 and 8 show various embodiments of a conveyed-products carrier 16, such as is known per se from the prior art and is also referred to as a "mover" or "shuttle" in accordance with the usual technical terminology. With regard to the structural design and the mode of operation of the conveyed-products carrier 16, reference is made by way of example to the German patent application DE 10 2020 105 678.8, the contents of which are to be fully attributed to the present description. In addition, it should be mentioned that the conveyed-products carrier 16 can be designed in the same way as is the case with the drive system marketed by the German company Beckhoff Automation GmbH under the product name "XPlanar".

At this point, it is only necessary to mention that the conveyed-products carrier 16 is moved without contact by a magnetic levitation system 17, whereby the magnetic levitation system 17 consists of several rectangular modules 18, 19, which are assembled to form a continuous conveying surface 20. The conveyed-products carrier 16 can be moved within the conveying surface 20 along a conveying path 21, whereby the conveying path 21 is only shown as an example in FIG. 8 and is freely programmable.

On the upper side of the conveyed-products carrier 16 there are numerous pins 22, which are arranged in a matrix in pin rows and pin columns, the adjacent pin columns each enclosing a recess 23, while the adjacent pin rows also enclose a recess 24.

In conveying operation, a food product 25 rests on the pins 22, which may be, for example, a stack of slices comprising a plurality of slices of sausage or slices of cheese, to give just one example.

Figure 9A:
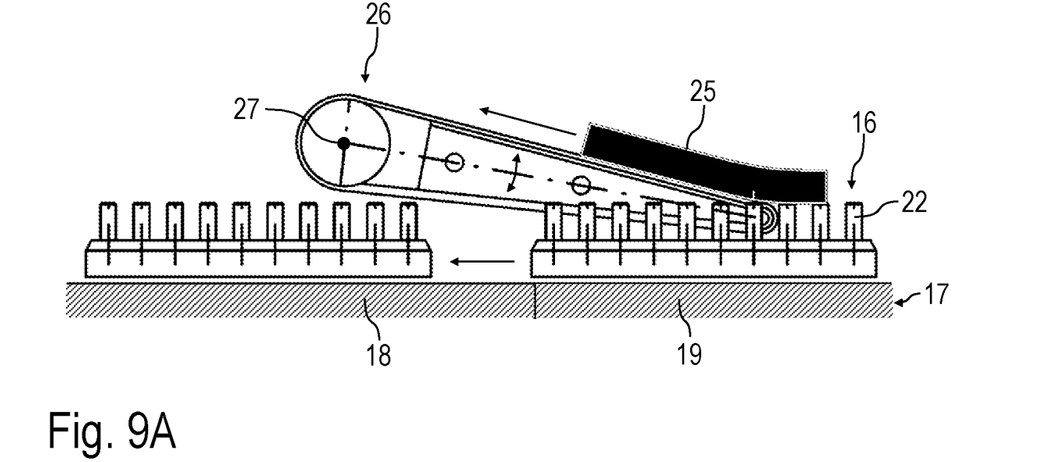
FIG. 9A shows a take-off conveyor according to the invention for taking off the food products from the conveyed-products carrier according to FIGS. 7 and 8.

Removal of the food products 25 from the conveyed-products carrier 16 is accomplished in the manner shown in FIG. 9A. For this purpose, a take-off conveyor 26 is used, which is designed in the manner described above, the take-off conveyor 26 being vertically pivotable about a pivot axis 27, as indicated by the double arrow in FIG. 9A.

The take-off conveyor 26 comprises a plurality of adjacent conveyor belts which, in the position shown in FIG. 9A, enter the recesses 23 or 24 between the pins 22 in order to engage under the food product 25 lying on the conveyed-products carrier 16. Subsequently, the food product 25 can then be discharged from the take-off conveyor 26 in the direction of the arrow.

Figure 9B:
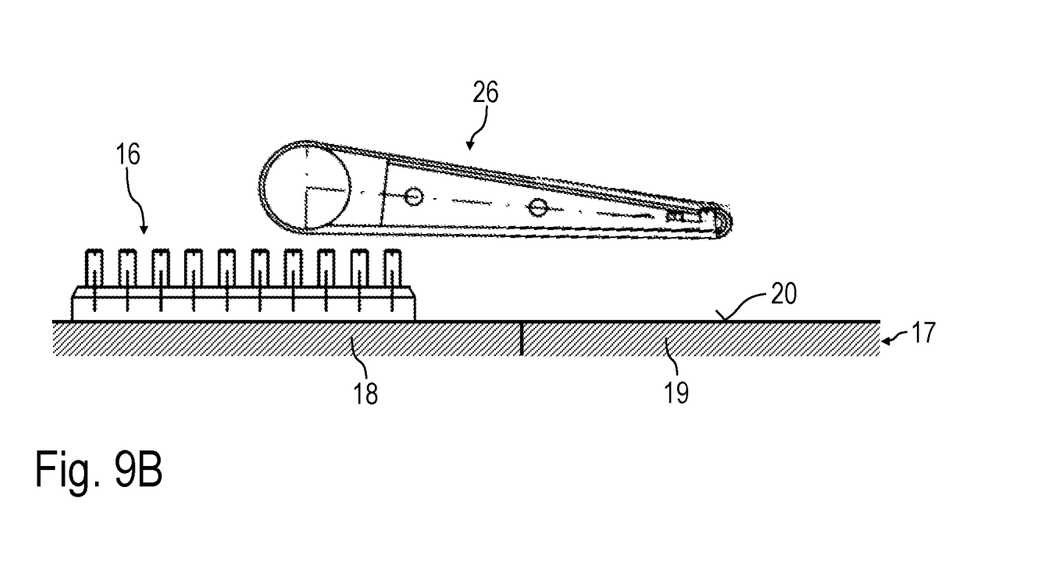
FIG. 9B shows the take-off conveyor of FIG. 9A in another pivoted position.

FIG. 9B shows a pivoted position of the take-off conveyor 26 which allows the food product carrier 16 to pass the upwardly pivoted take-off conveyor 26.

Figure 10:
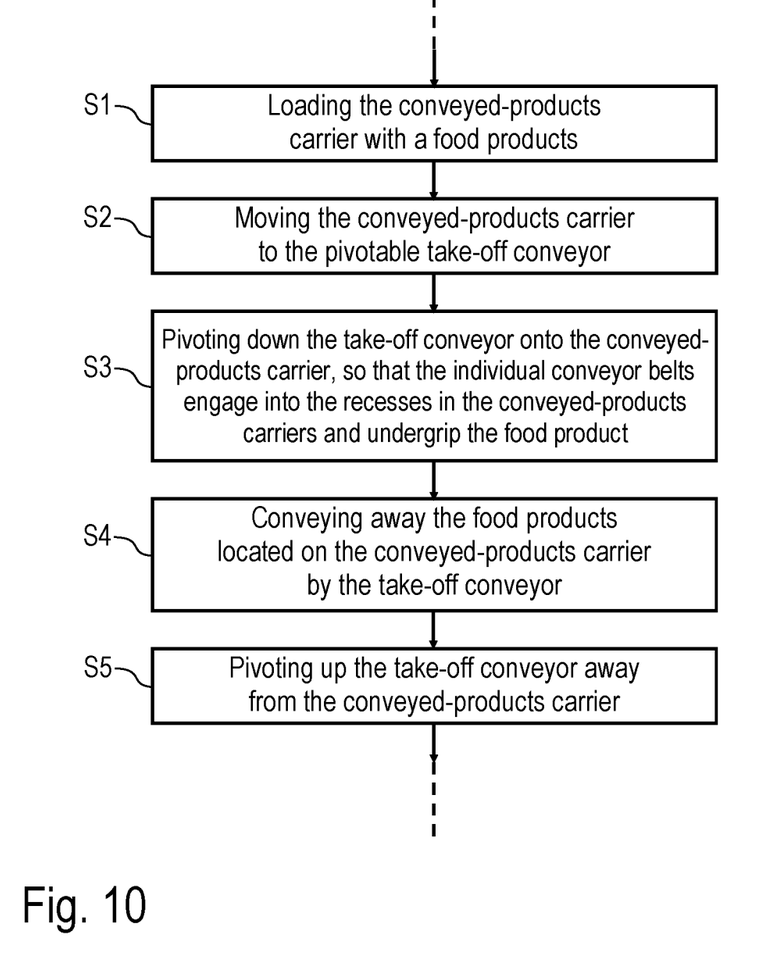
FIG. 10 shows a flow chart to illustrate the operating method according to the invention.

In the following, the flow chart shown in FIG. 10 will now be described, explaining the mode of operation already described above.

In a first step S1, the food product 25 is first loaded onto the conveyed-products carrier 16. For example, this can be done in a slicing station ("slicer") where food products are sliced into slices which then fall onto the conveyed-products carrier 16 and form a stack of slices.

In a further step S2, the loaded conveyed-products carrier 16 is then moved to the pivotable take-off conveyor 26.

In the next step S3, the take-off conveyor 26 is then pivoted downwards onto the conveyed-products carrier 16, with the individual conveyor belts of the take-off conveyor 26 diving into the recesses 23 and 24, respectively, and engaging under the food product 25 lying on the conveyed-products carrier 16.

In the next step S4, the food product 25 on the product carrier 16 is then discharged by the take-off conveyor 26, FIG. 9A.

In the next step S5, the take-off conveyor 26 is then pivoted upwards again, as shown in FIG. 9B, so that the take-off conveyor 26 then does not hinder the free movement of the individual food product carriers 16 within the conveying surface 20.

Figure 11A:
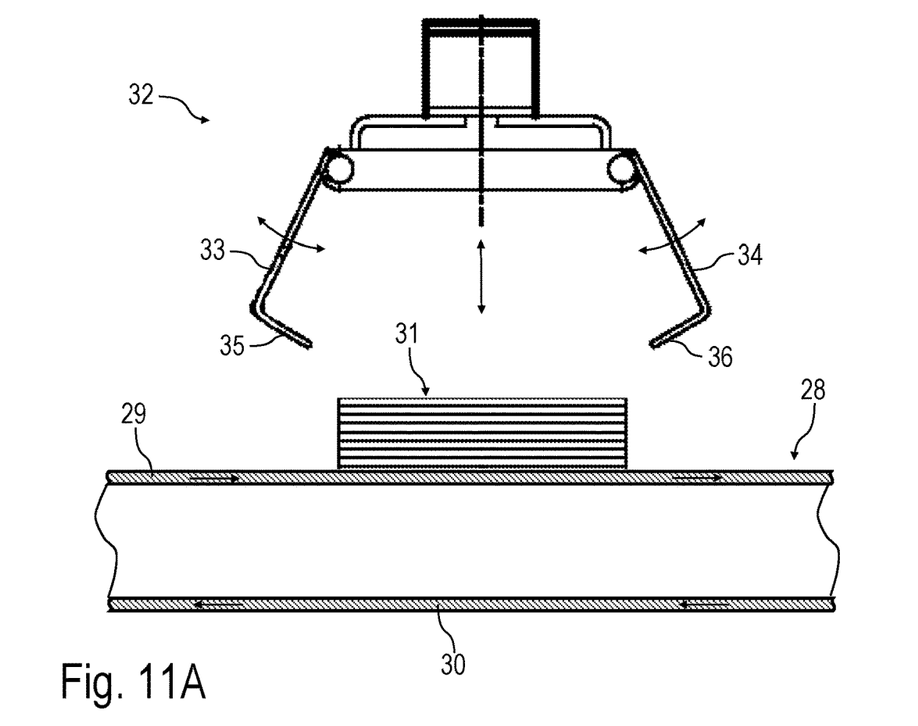
FIG. 11A shows an alternative embodiment with a robot-guided gripper that can remove food products from the belt conveyor according to the invention.
Figure 11B:
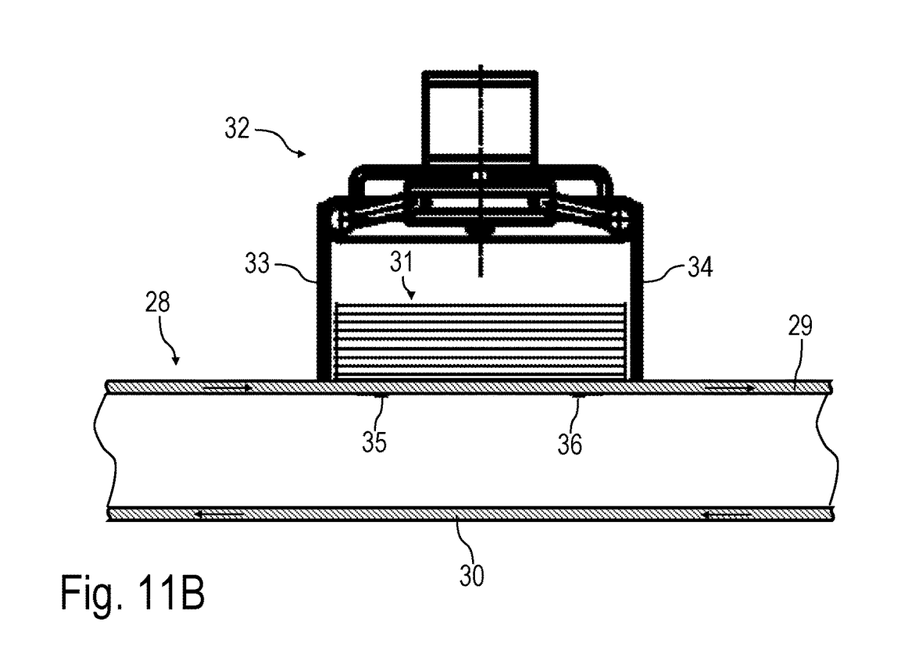
FIG. 11B shows the embodiment according to FIG. 11A in another position of the gripper.
Figure 11C:
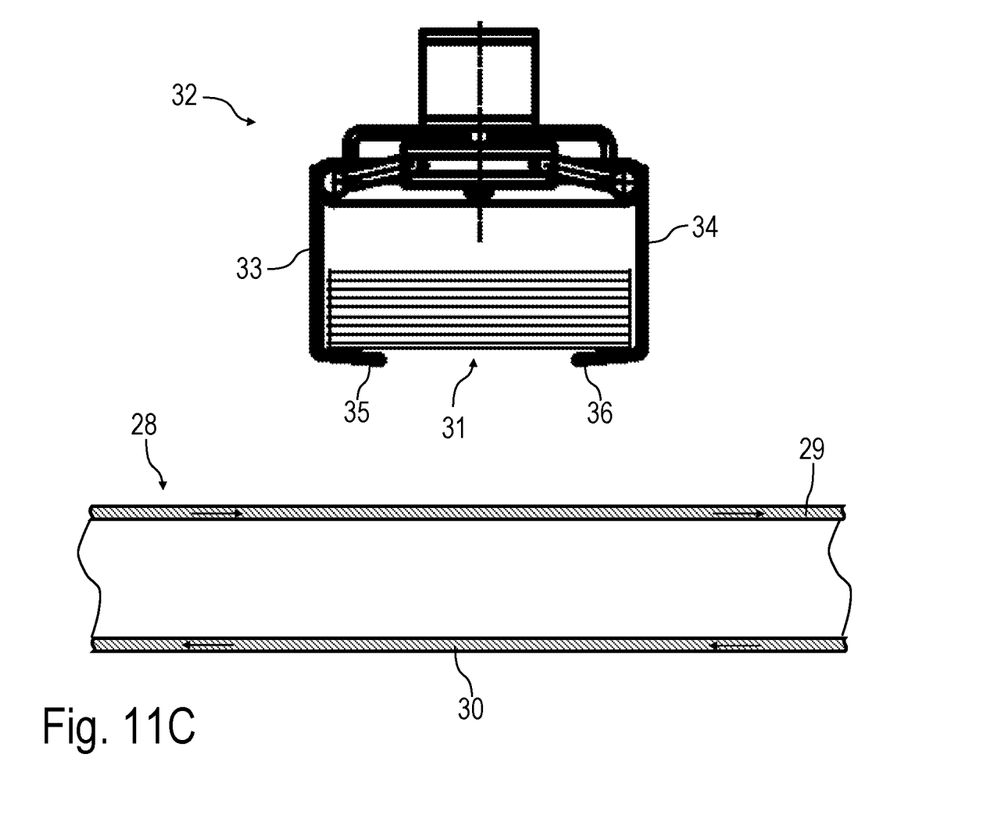
FIG. 11C shows the embodiment according to FIGS. 11A and 11B, wherein the gripper has lifted the food product from the belt conveyor.

FIGS. 11A-11C show an alternative embodiment for the use of a belt conveyor 28 according to the invention with an upper run 29 and a lower run 30, which move in the direction of the arrow during operation. In this case, a food product 31 lies on the belt conveyor 28 and can be conveyed in the direction of the arrow.

A gripper 31 can be positioned above the belt conveyor 28, wherein the gripper 31 can be guided by a robot, as is known from the earlier patent application WO 2010/011237 A1, so that the content of this earlier patent application is fully attributable to the description of this embodiment.

The gripper 31 has two pivotable gripper arms 33, 34, which can be swung open or closed in the direction of the double arrows. At the end of each of the two gripper arms 33, 34 there is a product support 35 or 36 for gripping under the food product 31. For this purpose, the gripper 31 is lowered onto the belt conveyor 28, with the two gripper arms 33, 34 diving into the gap between the adjacent conveyor belts of the belt conveyor 28.

Subsequently, the gripper arms 33, 34 are then pivoted together, as shown in FIG. 11B, so that the product support 35, 36 engage under the food product 31.

Finally, the gripper 31 is then lifted by the robot, lifting the food product 31 off the belt conveyor 28, as shown in FIG. 11C.

Figure 12:
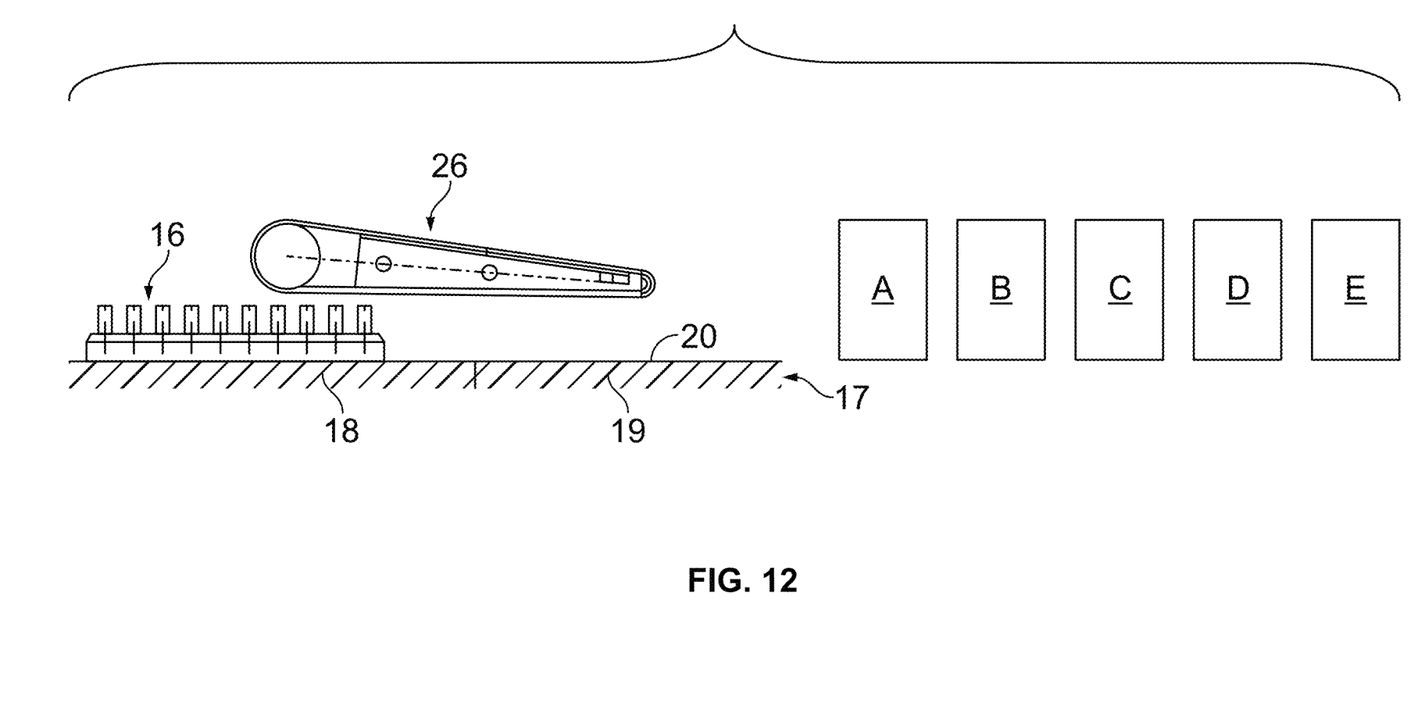
FIG. 12 shows a food processing installation including the belt conveyor.

As shown in FIG. 12, the food processing installation includes at least one of the following processing stations: a cutting device for cutting the food products into slices, and/or a weighing machine for weighing the food products or the slices of the food products, and/or a packaging machine for packaging the slices of the food products, in particular as a thermoforming machine or flow packer, and/or a product scanner for scanning the shape of the food products, and/or a press for pressing the food products. These components are shown as A, B, C, D, E in FIG. 12.

The invention is not limited to the preferred embodiments described above. Rather, the invention encompasses a variety of variants and variations which also make use of the inventive concept and therefore fall within the scope of protection. In particular, the invention also claims protection for the subject matter and the features of the dependent claims independently of the claims referenced in each case and, in particular, also without the features of the main claim. The invention thus comprises various aspects of the invention which enjoy protection independently of each other.

LIST OF REFERENCE SIGNS

1 Belt conveyor
2, 3 Conveyor belts
4, 5 Upper run of conveyor belts
6, 7 Lower run of the conveyor belt
8, 9 Deflection pulley of the conveyor belt
10 Rotation axis of the deflection pulleys
11 Annular groove in the deflection pulley
12, 13 Centre bar of the conveyor belt
14 Support bar
15 Bearing point at the end of the center web for supporting the deflection pulley
16 Conveyor belt support
17 Magnetic levitation system
18, 19 Modules of the drive system
20 Conveying surface
21 Conveyor path
22 Pins on the top of the conveyed-products carrier
23, 24 Recesses between the pins
25 Food product on the conveyed-products carrier
26 Take-off conveyor for taking off the food products from the product carrier
27 Pivot axis of the take-off conveyor
MS Centre bar for holding the return pulley
28 Belt conveyor
29 Upper run of the belt conveyor
30 Lower run of the belt conveyor
31 Food product
32 Gripper
33, 34 Gripper arms of the gripper
35, 36 Product supports of the gripper arms
b Width of the conveyor belt
a Distance between adjacent conveyor belts

The invention claimed is:

1. A belt conveyor for conveying products to conveyed comprising:
   a rotatable first deflection pulley having an annular groove extending circumferentially therearound, and
   a first conveyor belt guided around the first deflection; pulley, the first conveyor belt defining an upper run above the first deflection pulley and a lower run below the first deflection pulley, the upper run defining a first support surface on which the products are conveyed, the first conveyor belt having a first centre bar which engages within the annular groove of the first deflection pulley; and a first support bar on which the first deflection pulley is mounted, the first support bar extending between the upper and lower runs of the first conveyor belt and extending into the annular groove of the first deflection pulley, the first support bar having a bearing point engaged with the first deflection pulley such that the first deflection pulley is rotatable relative to the first support bar.

2. The belt conveyor according to claim 1, wherein the first conveyor belt has a width, and further comprising:

a rotatable second deflection pulley;

arranged next to, and aligned coaxially with, the first deflection pulley, the second deflection pulley having an annular groove extending circumferentially therearound; and a second conveyor belt having a width and being guided around the second deflection pulley, the second conveyor belt defining an upper run above the second deflection pulley and a lower run below the second deflection pulley, the upper run of the second conveyor belt defining a second support surface on which the products are conveyed, the second conveyor belt having a second centre bar which engages within the annular groove of the second deflection pulley, and wherein a gap is provided between the first conveyor belt and the second conveyor belt, the gap having a width which is dependent upon the widths of the first and second conveyor belts.

3. The belt conveyor according to claim 1, wherein the first deflection pulley is held only by the first support bar.

4. The belt conveyor according to claim 1, wherein the support surface of the first conveyor belt projects laterally beyond the first deflection pulley.

5. A food processing installation including a belt conveyor according to claim 1 and further comprising:

at least one conveyed-products carrier configured to convey the products along a conveying path within a conveying surface, wherein the belt conveyor is arranged above the conveying surface and is vertically pivotable, wherein the belt conveyor can be lowered with an infeed-side end thereof onto the conveyed-products carrier in order to pick up the products from the conveyed-products carrier, and wherein the belt conveyor can be swiveled up with its infeed-side end in order to allow the conveyed-products carrier to pass.

6. The food processing installation according to claim 5, wherein the belt conveyor comprises a second conveyor belt, wherein an upper side of the conveyed-products carrier comprises a plurality of parallel and elongated recesses into which the respective conveyor belts of the belt conveyor are configured to be inserted when the conveyed product is removed from the conveyed-products carrier.

7. The food processing installation according to claim 6, wherein a top side of the conveyed-products carrier has a plurality of pins projecting upwards therefrom and enclosing the recesses therebetween, wherein the pins are arranged in a matrix in pin rows and pin columns and/or the pin rows and the pin columns are optionally arranged at right angles to one another and/or the pins all have the same length and/or the pins project upwardly at right angles from the conveyed-products carrier and/or the pins are all aligned parallel to each other and/or the pins each have a round or angular cross-section.

8. The food processing installation according to claim 5, further comprising a contactless drive system configured to move the conveyed-products carriers within the conveying surface.

9. A food processing installation including a belt conveyor according to claim 1 and further comprising:

the food processing installation comprises at least one of the following processing stations:

a cutting device for cutting the products into slices, and/or a weighing machine for weighing the products or the slices of the products, and/or a packaging machine for packaging the slices of the products, in particular as a thermoforming machine or flow packer, and/or a product scanner for scanning a shape of the products, and/or a press for pressing the products.

10. A food processing installation including a belt conveyor comprising a plurality of conveyor belts according to claim 1, each conveyor belt being separated from an adjacent one by a gap, and wherein the food processing installation further comprises a gripper configured to grip the products on the belt conveyor, the gripper being adjustable between a gripping position configured to grip the products and a release position configured to release the products, the gripper being configured to be inserted into the gap between the respective adjacent conveyor belts to under grip the products on the belt conveyor.

11. The belt conveyor according to claim 1, wherein the first support bar is pivotable about a first pivot point.

12. The belt conveyor according to claim 2, wherein the first conveyor belt and/or the second conveyor belt comprises a T-shaped cross-section.

13. The belt conveyor according to claim 2, further comprising a second support bar on which the second deflection pulley is mounted, the second support bar extending between the upper and lower runs of the second conveyor belt and extending into the annular groove of the second deflection pulley, the second support bar having a bearing point engaged with the second deflection pulley such that the second deflection pulley is rotatable relative to the second support bar.

14. The belt conveyor according to claim 13, wherein the first support bar is pivotable about a first pivot point, and the second deflection is pivotable about a second pivot point.

15. The belt conveyor according to claim 13, wherein the second deflection pulley is held only by the second support bar.

16. The belt conveyor according to claim 2, wherein the first conveyor belt projects with its support surface laterally beyond the first deflection pulley and/or the second conveyor belt projects with its support surface laterally beyond the second deflection pulley.

17. The food processing installation according to claim 6, wherein the recesses in the conveyed-products carrier are wider than the respective conveyor belts of the belt conveyor so that the respective conveyor belts of the belt conveyor can dive into the respective recesses in the conveyed-products carrier.

18. The food processing installation according to claim 8, wherein the contactless drive system is a magnetic levitation system configured to allow the conveyed-products carriers to float contactlessly above the conveying surface.

19. The food processing installation according to claim 8, wherein the conveying path within the conveying surface is freely programmable, so that the individual conveyed-products carriers are freely movable within the conveying surface without being bound to a fixed conveying path.

20. The food processing installation according to claim 10, further comprising a robot configured to position the gripper.

21. A food processing installation for processing food products comprising:
   a belt conveyor configured to convey products to conveyed including a rotatable first deflection pulley including a central circumferential annular groove, a first conveyor belt guided around the first deflection, the first conveyor belt including on an inside of a centre bar which engages in the annular groove of the first deflection pulley, and a second conveyor belt; and
   at least one conveyed-products carrier configured to discontinuously convey the products along a conveying path within a conveying surface, wherein the conveyed-products carrier comprises, on its upper side, a plurality of parallel and elongated recesses for insertion of the conveyor belts of the belt conveyor when the conveyed product is removed from the conveyed-products carrier, and wherein the recesses in the conveyed-products carrier are optionally wider than the individual conveyor belts of the belt conveyor so that the individual conveyor belts of the belt conveyor can dive into the individual recesses in the conveyed-products carrier; and
   wherein the belt conveyor is arranged above the conveying surface and is optionally vertically pivotable, wherein the belt conveyor can be lowered with its infeed-side end onto the conveyed-products carrier in order to pick up the food products from the conveyed-products carrier, and wherein the belt conveyor can optionally be swivelled up with its infeed-side end in order to allow the conveyed-products carrier to pass.

22. The food processing installation according to claim 21,
   wherein the conveyed-products carrier comprises, on its top side, a plurality of pins which project upwards from the conveyed-products carrier and enclose the recesses between them,
   wherein the pins are optionally arranged in a matrix in pin rows and pin columns,
   wherein the pin rows and the pin columns are optionally arranged at right angles to one another,
   wherein the directly adjacent pin rows optionally enclose the recesses between them in pairs in each case,
   wherein the immediately adjacent pin columns optionally each enclose the recesses between them in pairs,
   wherein the pins optionally all have the same length, and/or
   wherein the pins optionally project upwardly at right angles from a loading surface, and/or
   wherein the pins are optionally all aligned parallel to each other, and/or
   wherein the pins optionally each have a round or angular cross-section.

23. A food processing installation for processing food products comprising:
   a belt conveyor configured to convey products including a rotatable first deflection pulley comprising a central circumferential annular groove, and a first conveyor belt which is guided around the first deflection, the first conveyor belt comprises on an inside of a centre bar which engages in the annular groove of the first deflection; and
   a conveyor system with at least one conveyed-products carrier for discontinuously conveying the food products along a conveying path within a conveying surface,
   wherein the belt conveyor is arranged above the conveying surface and is optionally vertically pivotable,
   wherein the belt conveyor can be lowered with its infeed-side end onto the conveyed-products carrier in order to pick up the food products from the conveyed-products carrier,
   wherein the belt conveyor can optionally be swivelled up with its infeed-side end in order to allow the conveyed-products carrier to pass,
   wherein the conveyor system comprises a contactless drive system for moving the conveyed-products carriers within the conveying surface,
   wherein the contactless drive system is optionally a magnetic levitation system, so that the conveyed-products carriers float contactlessly above the conveying surface,
   wherein the conveying path within the conveying surface is optionally freely programmable, so that the individual conveyed-products carriers are freely movable within the conveying surface without being bound to a fixed conveying path,
   wherein the conveyor system optionally comprises numerous modules which adjoin one another and together form the conveying surface, and
   wherein the individual modules of the conveyor system are optionally rectangular in order to be able to form the conveying surface without gaps.

* * * * *

UNITED STATES PATENT AND TRADEMARK OFFICE
CERTIFICATE OF CORRECTION

| | | |
|---|---|---|
| PATENT NO. | : 12,415,684 B2 | Page 1 of 1 |
| APPLICATION NO. | : 18/548900 | |
| DATED | : September 16, 2025 | |
| INVENTOR(S) | : Bialy et al. | |

It is certified that error appears in the above-identified patent and that said Letters Patent is hereby corrected as shown below:

On the Title Page

Item (72), under "Inventors", Line 7, delete "Constance (DE)" and insert -- Konstanz (DE) --, therefor.

In the Claims

In Column 8, Claim 1, Line 63, delete "deflection;" and insert -- deflection --, therefor.

In Column 9, Claim 2, Line 14, delete "pulley;" and insert -- pulley --, therefor.

In Column 10, Claim 7, Line 1, delete "are optionally arranged" and insert -- are arranged --, therefor.

Signed and Sealed this
Fourth Day of November, 2025

John A. Squires
*Director of the United States Patent and Trademark Office*